(12) United States Patent
Engel et al.

(10) Patent No.: US 7,180,851 B1
(45) Date of Patent: Feb. 20, 2007

(54) METHOD FOR QUICK IDENTIFICATION OF SPECIAL DATA PACKETS

(75) Inventors: Glenn R Engel, Stevens, WA (US); Glen L. Purdy, Jr., Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/320,200

(22) Filed: Jun. 24, 1999

(51) Int. Cl.
*H04J 1/16* (2006.01)
(52) U.S. Cl. .......................................... 370/216; 714/2
(58) Field of Classification Search ................ 370/230, 370/235, 216, 242, 389, 411, 429, 471, 395.32, 370/473, 474, 490, 488; 714/100, 2, 48, 714/52, 751, 758, 764, 799, 47
See application file for complete search history.

(56) References Cited

U.S. PATENT DOCUMENTS 4,507,782 A * 3/1985 Kunimasa et al. .......... 714/748

* cited by examiner

*Primary Examiner*—Brenda Pham

(57) ABSTRACT

In packetized data communication, certain special data packets must be identified quickly without the variable overhead of processing through the data protocol stack. A common example of such packets is those used for triggering events: immediate action must be taken on their arrival. This disclosure concerns a method for identifying such packets through the use of the error checking codes which are usually included in packet transmission protocols. By adding appropriate bits to a special data packet before transmission, the error checking code can be forced to a specific, predetermined sequence which will be recognized by error checking hardware at a receiver. If the specific sequence is all ones (or all zeros), the recognition hardware can be simplified.

8 Claims, 2 Drawing Sheets

| FIELD | SIZE, BYTES |
|---|---|
| PREAMBLE | 7 |
| START OF FRAME DELIMITER | 1 |
| DESTINATION ADDRESS | 6 |
| SOURCE ADDRESS | 6 |
| TYPE | 2 |
| DATA | 0 - 1500 |
| DATA PADDING | 0 - 46 |
| CHECKSUM (CRC) | 4 |

Fig. 2

METHOD FOR QUICK IDENTIFICATION OF SPECIAL DATA PACKETS

FIELD OF THE INVENTION

This invention relates to data transmission systems comprising a number of nodes connected by means of a communication medium which transmits packet-formatted, serial data among the nodes. More specifically, the invention relates to tagging, and then rapidly identifying, certain special data packets.

BACKGROUND OF THE INVENTION

Many data acquisition systems and large control systems rely on the intercommunication of data among a sizable number of nodes. For instance, an electric utility company may have numerous sensor nodes in various parts of its generation and distribution plants for determining the moment-by-moment state of power flow in the entire system. These sensors can be linked in a network and each would report to interested network nodes the parameters existing at its site.

A common method for transmitting serial data in such networks is to form data "packets". Each packet contains fields such as source address, destination address, size of the packet, error detection data, and the actual information to be carried. A packet is launched onto the network, and various routers and hubs insure that it is delivered to its destination(s).

The form of a packet is determined by agreed-on rules called protocols. At each transmitting node, raw data is converted into packets by a "protocol stack", usually a combination of hardware and software which transforms the data into the appropriate form. Nearly all packet protocols require adding a checksum or similar data whose purpose is to allow the detection of errors which might occur during packet travel. Conversely, a node, which receives a packet, uses an inverse protocol stack to extract the data contained therein. The receiving process usually includes checking the packet for those possible errors.

Sometimes there is a need for rapid identification of a special packet. An example of this is the need for time synchronization among the many nodes in a network, each of which probably has a local clock. A master node sends out a special packet with a time-stamp for other nodes to use to synchronize their local clocks. In this case, it is desirable to identify the special time packet as soon as it arrives. Otherwise, processing the packet with the protocol stack to discover that it is a time sync packet would introduce variable time delays which would degrade the accuracy of synchronization.

A pertinent example of the detection of such special packets is found in Eidson et al, "METHOD FOR RECOGNIZING EVENTS AND SYNCHRONIZING CLOCKS", U.S. Pat. No. 5,566,180, which is assigned to the present assignee. In this disclosure, special packets containing time information are recognized upon arrival at a receiving node by the use of hardware which looks for, and "recognizes signatures of specially designated timing packets in a jitter-free fashion," (col. 2, line 53). That is, the hardware identifies the special packet almost simultaneously with its arrival, thus avoiding the timing uncertainty caused by the protocol stack and interrupts, etc., occurring in the node's operating system.

Although the disclosed method of this patent is quite effective in recognizing special packets, a practitioner will notice that a fair amount of hardware is needed to implement it, which hardware must be duplicated in every node in the network. It would be advantageous to rapidly recognize such special packets without this elaboration of hardware.

SUMMARY OF THE INVENTION

Serial data transmission networks commonly transport data packets formed according to the rules of a particular protocol. For some kinds of special packets, such as event trigger signals, it is essential to identify such a packet as it arrives, since the overhead of processing the packet with the protocol stack introduces variable time delays which degrade the triggering accuracy. The invention disclosed herein provides methods for creating and also rapidly identifying special packets. The invention can be implemented with relatively simple and, hence, small and inexpensive hardware.

The methods make use of the fact that protocols for data packet communication almost always include a procedure for checking a received packet to determine whether it has suffered errors in transmission. When transmitting a special packet according to the invention, a transmitting node "tags" the packet by modifying the data content—such as by "bit stuffing" (adding data)—so that the error checking algorithm produces a specified sequence. A receiving node will then look for that sequence in order to identify the special, tagged packet. Because the error detection circuitry examines the incoming data almost without delay as it arrives, a special packet can be instantly identified by its error detection sequence. Since error detection circuitry is already in place in the receiver, only a small additional amount of circuitry is needed for identifying a special packet. This additional circuitry may be further simplified if the specified sequence consists of all zeros or all ones, as these sequences may be detected with simple gates without the need for storing a copy of an arbitrary special sequence.

As an alternative to using the error detection code over the entire packet, a subset of the packet may be selected for generating the desired sequence. An example of the usefulness of this alternative is the case in which a layer of the protocol might add field(s) to the packet which would not be visible to the error detection system.

BRIEF DESCRIPTION OF THE DRAWINGS

FIG. 2 shows the organization of a data packet according to the Ethernet protocol

DETAILED DESCRIPTION OF PREFERRED EMBODIMENTS

Figure 1:
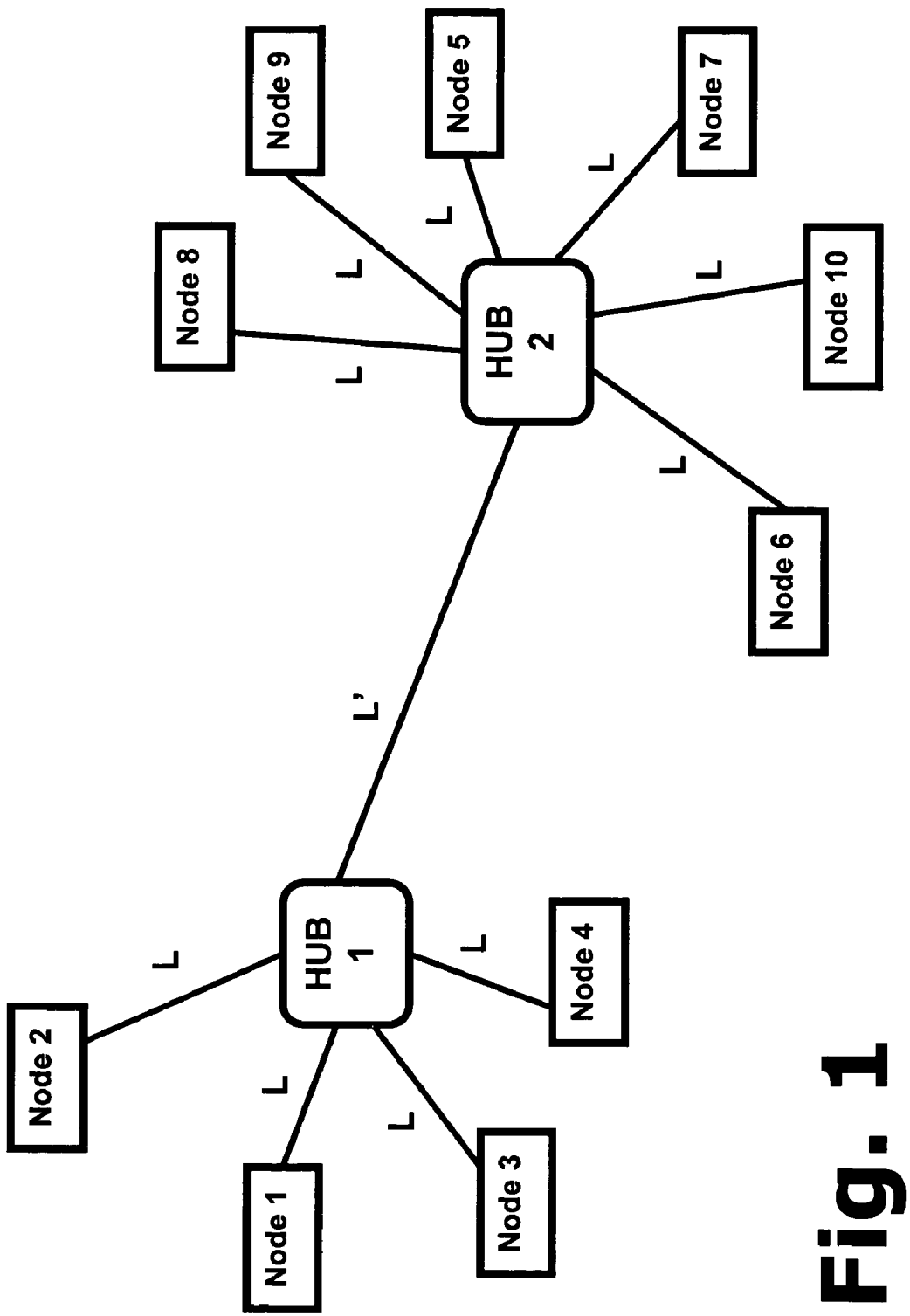
FIG. 1 illustrates a typical network used in packet data transmission among a number of nodes

Refer now to FIG. 1, which is a simplified illustration of a typical distributed network for intercommunicating among 10 nodes. This network is organized in two groups of nodes: nodes 1–4 and nodes 5–10. Each group has a central hub with individual links L to each node. Hub 1 thus connects with nodes 1–4, hub 2 connects with nodes 5–10, while L' interconnects the hubs themselves. These hubs are simply repeaters. That is, when a hub receives an incoming signal on any of the lines L or L', it sends out a replica of that signal on every other line connected with it. For instance, if a signal originates in node 8, it travels to hub 2, which repeats it to the other 5 nodes connected directly to it and also sends it across L' to hub 1. From hub 1, the signal reaches nodes 1–4 in the same manner. Thus a signal originated by any node is communicated to all nodes.

FIG. 1 is intended to illustrate "packet" data communication. That is, in order for a node to be able to send data to any other node, the data to be transmitted between them is organized in a serial grouping called a packet. The serial grouping is defined by a set of rules called a protocol. In general, a packet combines an origination address, a destination address, and the size of the data block, the data block itself, and information called a checksum. The checksum is included to provide a means for the receiving node to detect whether a packet suffered errors during transmission.

Since all nodes are exposed to all traffic on the network, it is necessary for each node at least to examine the destination address of every packet. When a node discovers its own address in the destination field of a packet, the node completes the receiving protocol and extracts the data. Otherwise, it ignores the packet and continues monitoring the network.

As previously explained, it is sometimes necessary to transmit special packets which must be recognized immediately upon arrival at any receiving node. Such special packets include time synchronizing packets and trigger packets for initiating simultaneous response from a number of nodes. It is evident that processing such a packet with the full receiving protocol, in order to recognize the special nature of the packet from the data therein, could result in an unacceptable time delay. And, in general, this delay would be variable, because the protocol processing time is likely to be data dependent and to include other uncontrolled intervals such as microprocessor interrupt latencies.

In the disclosed invention, this time delay is avoided, and nearly instant recognition of special packets is achieved through manipulation of the error detection method defined by the protocol. This result is achieved without weakening or compromising the primary function of the error detection.

In a preferred embodiment of the invention, a widely used protocol—IEEE Standard 802.3, also known as Ethernet—is used for organizing data packets. FIG. 2 illustrates the content of an Ethernet packet. The packet is transmitted serially, with the preamble bits arriving first. The PREAMBLE field—alternating ones and zeros—is for synchronizing the data clock at the receiving node, while the START-OF-FRAME defines precisely where information starts. The DATA PADDING field can be used if the amount of data to be sent is less than the specified minimum. The CHECKSUM field contains the results of an algorithmic process performed on the rest of the packet, and allows a receiver, by duplicating the process, to determine whether the data has been corrupted in transmission. In the Ethernet protocol, the checksum is a "cyclic redundancy code" or CRC.

In operation, a receiving node examines the destination address of an incoming packet to determine whether the address is valid: either its own or one of a (small) number of broadcast or multicast addresses. Fast hardware performs this comparison. If the address is valid, the hardware shifts the entire serial packet into the protocol stack for processing. While it is moving, additional hardware applies the Ethernet error-detection algorithm to the packet. The algorithm's computed checksum is compared with the checksum field. If there is a mismatch, an error-handling routine is invoked. Otherwise, the protocol stack begins processing the packet's contents.

To create an instantly-recognizable special packet, the disclosed invention tags the packet by adding bits to the data and/or data padding fields so that the modified packet causes the error-detection algorithm to generate a specific, predetermined checksum.

To detect such a special packet, the disclosed invention uses hardware to compare the predetermined value with the computed checksum (or, equivalently, with the incoming checksum field). When such comparison is made, appropriate action is taken immediately, such as logging the arrival time, sending a trigger signal, etc.

Although any 32 bit pattern can be defined as the specific, predetermined checksum, in practice it is simpler to use 32 ones or zeros, as this eliminates the need to store an arbitrary pattern for comparison with the checksum. Such comparison can thus be made with gates alone.

Practitioners of this and related arts will know how to construct digital hardware for implementing the methods described. However, the method for generating a specific checksum is now explained in greater detail.

The CRC value is computed by dividing the packet bits by a specified $32^{nd}$ order (33-bit) word, and defining the remainder from the division to be the CRC. (Some details, including complementing certain quantities before and after computing the CRC, are not essential for explaining the present invention and are not used in the following example; the entire CRC process is described in IEEE 802.3). However, the computation does not use conventional binary arithmetic, but "binary arithmetic, modulo 2, with no carries". Details of this may be found in Tanenbaum, "Computer Networks", ISBN 0131646990, and particularly pages 128–132. In this arithmetic, both addition and subtraction are equivalent to the exclusive-OR (XOR) operation.

An appendix to this disclosure contains C-language code which performs the operation of adding padding bits to a data stream in order to achieve a predetermined CRC. The following example illustrates the CRC-modifying methods of the disclosed invention, but uses much smaller packet and divisor sequences than those of a typical Ethernet packet, in order for the illustration to be readable.

Let a packet consist of the sequence 1101011011, and let the divisor be 10011. Then a standard CRC is computed by first appending 4 zeros (4 is the order of the divisor) to the packet and then dividing.

```
        1100001010 (dividend, not used)
10011)11010110110000
      10011........,
       10011
       10011......,
        010110
         10011..,
          10100
          10011,
           1110 (4 bit remainder or CRC)
```

In this simplified Ethernet example, the CRC value 1110 is appended to the packet and the transmitted sequence is 11010110111110.

Now, to generate an arbitrary new CRC, say 1100, a three step procedure is followed: first, an intermediate CRC' is generated by adding 4 zeros to the original packet to allow space for the padding bits which will result from the modification.

```
          11000010101111
10011) 110101101100000000
       10011
        10011..,..,..,..,
         10011
          10110..,..,
           10011
            10100.,...,
             10011
               11100..,
               10011
                11110.,
                10011
                 11010,
                 10011
                  10010
                  10011
                   0001 (CRC')
```

Second, CRC' is added to the desired new CRC (0001)XOR(1100)=1101

Last, the padding bits are computed by bit-reversing this sum, adding 4 zeros, and dividing by the bit-reversed divisor:

```
              1101
11001) 10110000
       11001
        11110
        11001
         011100
         11001
          0101 (reversed pad bits)
```

The bit-reversed result 1010 is then added to the original sequence, and the transmitted sequence is 110101101110101100.

As a check, the new CRC computation correctly yields

```
          11000010100100
10011)110101101110100000
      10011
       10011..,..,..,
        10011
         010111,..,..,
          10011
           10001.,..,
           10011
            10000.,
            10011
             1100(CRC)
```

In order to generate a new CRC with the specific value zero, as taught in this disclosure, the same procedure is followed. The intermediate CRC' is added to 0000:

(0001)XOR(0000)=0001

Bit-reversing and dividing as before:

```
           1101
11001)10000000
      11001
       10010
       11001
        10110
        11001
         11110
         11001
          0111 (reversed pad bits)
```

Reversing the remainder, adding it to the packet, and computing the new CRC gives the desired result:

```
           11000010100000
10011)110101101111100000
      10011..,..,..,..,.
       10011
       10011
        010111..,..,.
         10011
          10011,..,.
          10011
           000000(CRC)
```

Similarly, to generate a CRC of all ones:

(0001)XOR(1111)=1110

```
          0101
11001)01110000
      11001
       10100
       11001
        1101 (reversed pad bits)
```

Reversing 1101 and appending as padding bits generates the desired CRC:

```
           1100001010000
10011)1101011011101100000
      10011
       10011..,..,..,...,
        10011
         010111
         10011,..,..,
          10001
          10011,..,
           10100
           10011.,
            11100
            10011
             1111(CRC)
```

In implementing the disclosed invention, it sometimes happens that all the bits of a packet to be transmitted are not accessible to the system responsible for generating the modified checksum. For instance, a higher level of protocol might add a field to a packet at a later stage, affecting the checksum. In these cases, another embodiment of the invention is useful. Rather than the entire packet, a subset of the packet may be used to generate a "private" checksum. For example, the source and destination fields, and the first 20 bytes of the user payload of the data field could be used. At a receiving node, hardware isolates these bits, computes a checksum, compares it with that expected for a special packet, and responds instantaneously when it matches. If desired, an algorithm other than the one for the main checksum may be used to compute a private checksum from a portion of a packet.

Although the Ethernet network protocol is exemplified in the disclosed embodiment, it is clear that the principles of the invention will apply to any packet protocol. For instance, in a simple checksum consisting of the sum (or modulo sum) of blocks of bits, additional bits may be added to the data block in order to force the checksum to a desired value. Thus, the detailed description is intended to illustrate the invention, the scope of which is to be determined by the appended claims and equivalents.

APPENDIX

The following C code computes the padding bits needed to achieve a desired CRC, and is suitable for standard Ethernet packets. The routine "crc32" computes a CRC, while "revCrc32" computes the pad bits. The main routine is set up for demonstration, but may be conventionally modified to be included in actual system code.

```c
#include "stdio.h"

define POLY 0xedb88320L /*reversed standard Ethernet divisor*/ define BITS 8 define INIT 0xffffffff define DESIREDCRC 0x55555555/*"special" CRC*/ define NEGATEOUT define MESSAGE "This is a test!!\000\000\000\000"

define MESSAGELEN 20 define REVCRCCHK 0x80000000 define REVDATACHK 0x80 unsigned long crc32(const void* blk_adr, unsigned int blk_len)
{
  const unsigned long poly=POLY;
  unsigned long crc=INIT;
  unsigned char *blkPtr=(unsigned char *)blk_adr;
  /* sequence through each byte of the input sequence */
  while (blk_len—)
  {
    int i;
    unsigned char data=*(blkPtr++);
    /* include each bit of the data, starting with the lsb */
    for (i=0; i<BITS; i++)
    {
      if ((crc ^ data) & 1)
      {
        crc=(crc >>1);
        crc ^=poly;
      }
      else
      {
        crc=(crc >>1);
      }
      data>>=1;
    }
  }
  return crc^0xffffffff;
} unsigned long revCrc32(const void* blk_adr, unsigned int blk_len)
{
  unsigned long poly=POLY;
  unsigned long crc=DESIREDCRC;
  unsigned char *blkPtr=(unsigned char *)blk_adr;
  poly=(poly <<1) |1;
  /* sequence through each byte of the input sequence */
  while (blk_len—)
  {
    int i;
    unsigned char data=*(blkPtr++);
    /* include each bit of the data, starting with the msb */
    for (i=0; i<BITS; i++)
    {
      if (((crc & REVCRCCHK) !=0) !=((data & REVDATACHK) !=0))
      {
        crc=(crc <<1);
        crc ^=poly;
      }
      else
      {
        crc=(crc <<1);
      }
      data <<=1;
    }
  }
  return crc;
} int main(int argc, char* argv[ ])
{
  char buf[ ]=MESSAGE;
  char tmpbuf[4];
  long crc, pad;
  crc=crc32(buf, MESSAGELEN);
  printf("Initial CRC is %081x\n", crc);
  /* compute the desired padding bytes */
  tmpbuf[3]=crc & 0xff;
  tmpbuf[2]=(crc >>8) & 0xff;
  tmpbuf[1]=(crc >>16) & 0xff;
  tmpbuf[0]=(crc >>24) & 0xff;
  pad=revCrc32(tmpbuf, 4);
  printf("Padding bits are %081x\n", pad);
  /* place the padding bytes into the message and recompute CRC */
  buf[MESSAGELEN-4]=pad & 0xff;
  buf[MESSAGELEN-3]=(pad >>8) & 0xff;
  buf[MESSAGELEN-2]=(pad >>16) & 0xff;
  buf[MESSAGELEN-1]=(pad >>24) & 0xff;
  crc=crc32(buf,MESSAGELEN);
  printf("Resulting CRC is %081x\n", crc);
  return 0;
}
```

What is claimed is:

1. In a data transmission system for transporting data packets created according to a defined data protocol for processing data, the protocol including a) a process for computing an error detection code to be included in a packet transported by the system and b) a process for detecting possible errors in the packet by utilizing such error detection code, a method for tagging a special data packet, comprising the steps of:

1) examining the special data packet without the error detection code;
2) determining, from the examining step, additional data to be included with the special data packet in order to cause the error detection process to compute a predetermined sequence of error detection code; and
3) modifying the special data packet by including the additional data determined by the determining step.

2. A method for tagging a special data packet, as recited in claim 1, in which the predetermined sequence is composed of identical symbols.

3. In a data transmission system for transporting data packets created according to a defined data protocol for processing data, the protocol including a) a process for computing an error detection code to be included in a packet transported by the system and b) a process for detecting possible errors in the packet by utilizing such error detection code, a method for detecting a special data packet, comprising the steps of:

1) identifying, by reference to the data protocol, error detection code associated with a data packet;
2) comparing the error detection code with a predetermined sequence; and
3) determining the data packet to be a special tagged data packet when the comparing step results in a match.

4. A method for tagging a special data packet, as recited in claim 3, in which the predetermined sequence is composed of identical symbols.

5. In a data transmission system for transporting data packets created according to a defined data protocol for processing data, a method for tagging a special data packet, comprising the steps of:

1) defining a subset of data within the special data packet, excluding any error correcting code contained in the packet;
2) by utilizing a suitable algorithm for generating a code sequence as a function of the data subset, determining what additional data which, when added to the subset, causes the algorithm to generate a predetermined code sequence; and
3) adding the additional data to the data packet.

6. A method for tagging a special data packet, as recited in claim 5, in which the predetermined sequence is composed of identical symbols.

7. In a data transmission system for transporting data packets created according to a defined data protocol for processing data, a method for detecting a special data packet, comprising the steps of:

1) identifying a predefined subset of data within a trial data packet;
2) generating a code sequence as a function of the subset by utilizing a suitable algorithm;
3) comparing the generated code sequence with a predetermined sequence; and
4) identifying the trial data packet as a special data packet when the comparing step results in a match.

8. A method for detecting a special data packet, as recited in claim 7, in which the predetermined sequence is composed of identical symbols.

* * * * *

UNITED STATES PATENT AND TRADEMARK OFFICE
CERTIFICATE OF CORRECTION

| | |
|---|---|
| PATENT NO. | : 7,180,851 B1 |
| APPLICATION NO. | : 09/320200 |
| DATED | : February 20, 2007 |
| INVENTOR(S) | : Engel et al. |

It is certified that error appears in the above-identified patent and that said Letters Patent is hereby corrected as shown below:

In column 9, line 33, in Claim 4, delete "tagging" and insert -- detecting --, therefor.

Signed and Sealed this

Twenty-sixth Day of August, 2008

JON W. DUDAS
*Director of the United States Patent and Trademark Office*